June 12, 1923.                                          1,458,278
A. DE BRETTEVILLE ET AL
SHOCK ABSORBER
Filed April 19, 1920            2 Sheets-Sheet 1

INVENTORS
Alexander DeBretteville
and
George J Strury
by George J Strury
Attorney

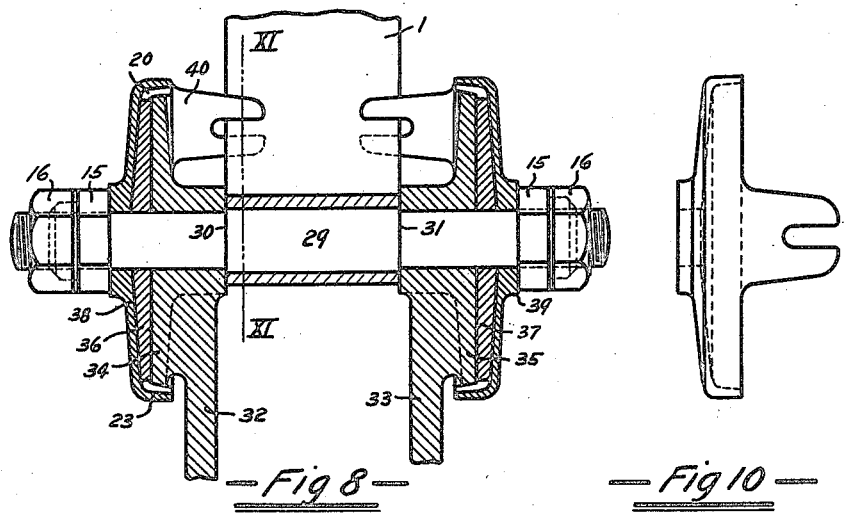
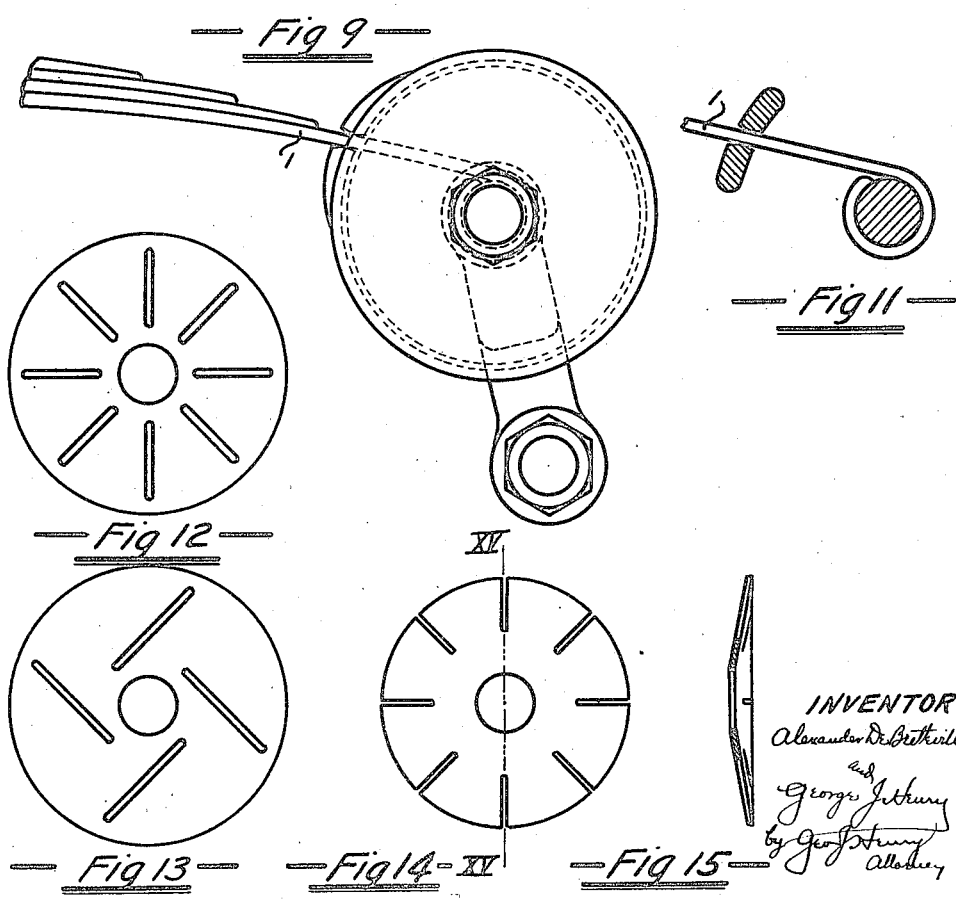

Patented June 12, 1923.

1,458,278

UNITED STATES PATENT OFFICE.

ALEXANDER DE BRETTEVILLE AND GEORGE J. HENRY, OF SAN FRANCISCO, CALIFORNIA.

SHOCK ABSORBER.

Application filed April 19, 1920. Serial No. 374,787.

*To all whom it may concern:*

Be it known that we, ALEXANDER DE BRETTEVILLE and GEORGE J. HENRY, citizens of the United States, and residents of the city and county of San Francisco, State of California, have invented new and useful Improvements in Shock Absorbers, of which the following is a specification.

Our invention has for its object the introduction of improvements to establish a friction against movement about the pivotal supports of springs, as the springs of a vehicle and their shackle connections. This object we attain by establishing about the axis of movement of the spring and supporting bolt a pair of friction surfaces at right angles to the axis of the said bolt, one of said surfaces being constrained to rotate about the said axis with the spring member, and the other surface fixed to oppose said movement.

By referring to the accompanying drawing our invention will be made clear:

Fig. 8 shows an alternate method of construction in cross section, otherwise similar to Fig. 2.

Fig. 9 is a side view of the parts shown in Fig. 8.

Fig. 10 is a view of a part of one of the side members shown in Fig. 8.

Fig. 11 is a cross section on the line XI, XI, of Fig. 8.

Fig. 12 is a detail of a friction disc, adapted to be located between the movable plate members showing recesses for lubricant.

Fig. 13 shows an alternate construction shown in Fig. 12.

Fig. 14 is a detail of a spring washer which way be employed in the construction shown in either Figures 2 or 8.

Fig. 15 is a cross section on the line XV—XV of Fig. 14.

Throughout the figures similar numerals refer to identical parts.

Figure 1:
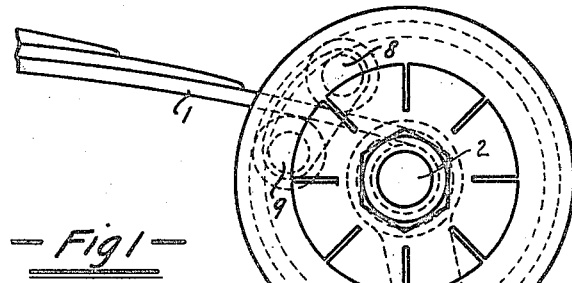
Fig. 1 is a side view of a portion of a spring mounted in the well-known way, from its support and with the shackle connection, to which has been applied our invention.
Figure 3:
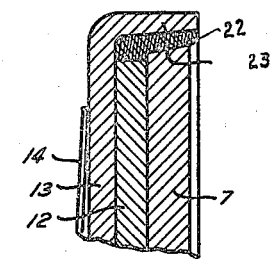
Fig. 3 is an enlarged detail of a part of the device as indicated by the arrow III of Fig. 2.

A vehicle spring is indicated by numeral 1, of any well known type, and which is formed on its end to encircle and be supported by the pivot bolt 2, the latter being in turn supported from the shackles 3, 4, which in turn may be supported either from another spring or stationary member 5, as through the second pivot 6.

Referring particularly to Figs. 1 to 6 inclusive: in applying our invention we prefer to extend the pivot, or shackle bolt 2 to engage the friction elements indicated and which consist of a plate 7, having formed thereon extensions 8, 9, and which are adapted to straddle the spring 1. These may be advantageously made circular as indicated in Figs. 1, 2, 4 and 5, and fitted with bushings, as 10, 11 of such dimensions as will lock tightly the spring member 1 between them thereby locking positively the plate 7 to the spring so that it will move in a rotary direction about the axis of the bolt 2, when spring movement occurs.

The plate 7 is faced to receive the friction disc member 12, and against the opposite face of which is the second disc member 13 which may be formed of spring material if desired, or may be retained in position by the support spring member 14, the latter in turn to be held under suitable compression as by the nut 15 and locknut 16 engaging the extension 17 of the bolt 2. A shoulder at 18 is to be turned, against which bears the shackle 4, and against which the members 7, 12, 13 and 14 may be compressed by the nut 15 without binding the movement of the spring 1 on the bolt 2. The nut 19 on the opposite end of the bolt 2 may then be used to adjust the length of the latter so that the spring 1 may move freely between the shackles 3 and 4.

On the lower end of the plate 13 we form extensions 20, 21 which are dressed on their inner faces to snugly hug the shackle 4, thereby constraining the plate 13 to rotate about the axis of the bolt 2 in exact synchronism with the shackle 4.

It will thus be seen that any change in the angle between the spring 1 and the shackle 4 (Fig. 1) will occasion a relative rotation between the surfaces of the discs 7 and 13, which are compressed against the friction plate 12 by the spring member 14 thus establishing a restraint to any vibratory action between the spring 1 and the support 5, and so will prevent such vibration and allowing the vehicle, or other device, not shown, but which is supported by the spring 1, to ride freely without oscillating or vibrating after any given spring movement and so effectually absorbing the shock attendant upon an uncushioned spring suspension.

At 22 is shown a felt washer engaged by the circular flange 23 and which is to prevent the ingress of dirt and the loss of lubricant between the friction surfaces of the plates 7 and 13.

Figure 7:
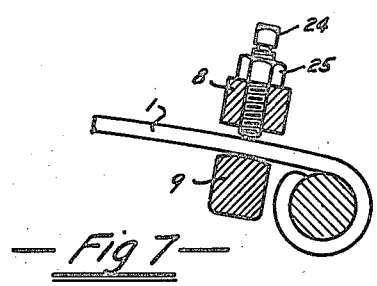
Fig. 7 is an alternate method of adjusting the holding member for one of the friction surfaces and differing somewhat from that disclosed in Fig. 5.
Figure 5:
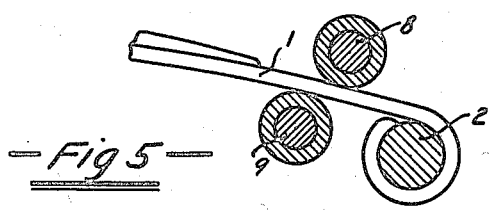
Fig. 5 is a cross section on the line V, V, of Fig. 2.

As an alternate construction for securing the rotation of either of the discs 7 or 13 with the spring member 1, or shackle 4, respectively, the construction shown in Fig. 7 may be employed, in which case an adjustment for the thickness of the spring 1 is effected by the cap screw 24 and locknut 25, and this method may be employed either about the spring 1, as shown, or by suitable spacing of the members 20, and 21, one of which may be bossed and tapped and provided with a similar set screw 24 and nut 25.

Although we have shown the friction plate 12 between the friction surfaces of the discs 7 and 13, this is not necessary to practise our invention as the surfaces of 13 and 7 may be brought together and recessed if desired for lubricant. However, the preferred construction involving the plate 12 enables a better distribution of wear to be effected in practise and may advantageously be made of other material, or of bronze, whereas the discs 7 and 13 we prefer to form of steel.

In Figures 12 and 13 are shown forms of grooving or recessing for containing lubricant, either in the disc 12 or in one or both of the contacting surfaces of 7 or 13, and we prefer to pack these with a heavy grease, or graphite, whereby lubrication of the surfaces is retained over a long period by the felt washer 22 and dirt thus prevented from working its way between the friction surface and causing their destruction.

Figure 2:
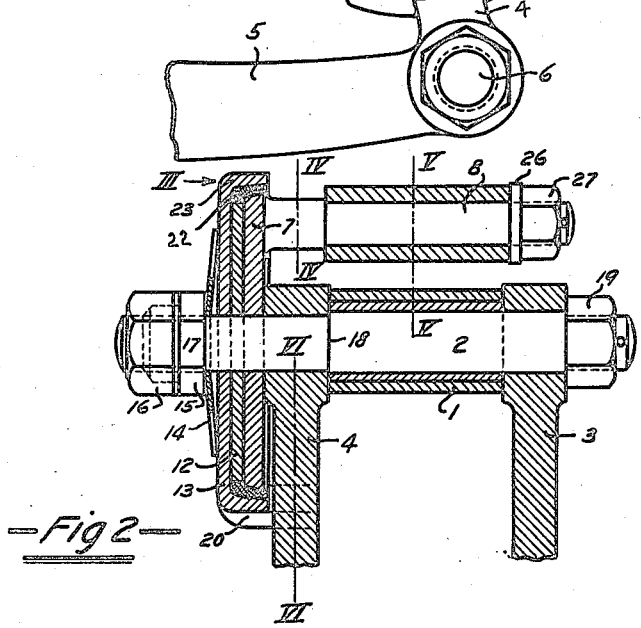
Fig. 2 is a cross section of Fig. 1 on the line II—II.
Figure 6:
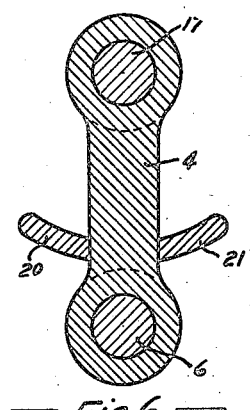
Fig. 6 is a cross section on the line VI—VI of Fig. 2.
Figure 4:
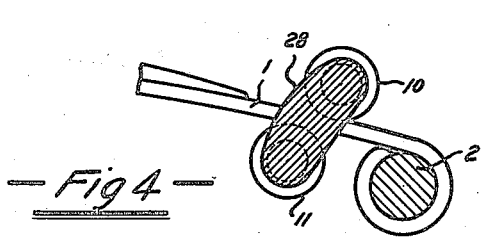
Fig. 4 is a cross section on the line IV—IV of Fig. 2.

In some instances it is advisable, especially where the spring member 1 is wide and the load to be carried is heavy, to extend the members 8, 9 as shown in Fig. 2, entirely across the spring and to connect them together on the opposite end from the disc as by the plate 26 and nuts 27, also where the overhang of these members 8 and 9 from the surface of the disc 7 is considerable we prefer to form them as extensions beyond a block indicated in cross section at 28, Fig. 4.

It will be observed that the form here employed for illustration, of the disc 7, block 28, and extensions 8, 9, may advantageously be drop-forged securing the greatest rigidity and cheapest and most efficient construction, also that the disc 13 with its flange 23 and extensions 20, 21 may advantageously be drop-forged, whereas the spring member 14 may be punched from sheet spring steel (see Figs. 14–15).

Referring now to Figs. 8 to 11 inclusive, the construction here shown is more especially adapted to be employed where installed with the springs and spring shackles in a vehicle factory. The shackle bolt 29 is extended on each end similar to the extension 17 of Fig. 2, and is provided with a pair of shoulders 30, 31, and supported from the shackle members 32, 33. These latter are formed with the side disc members 34, 35, the faces of which members are adapted to frictional engagement. The friction plates 36, 37 in this construction we prefer to form on one or both faces, slightly conical, and the second friction disc 38, 39 to be formed concentric therewith, the conical shape thereof establishing a stiffening under the pressure created by drawing up the bolt nut 15 against the shoulder 30. In this construction the outer portion of the plates 38, 39 may be formed with the flange 23, capable of retaining the felt washer 22 as previously described. The edge of the flange 23 may be extended to form the lug 40, and this lug is to be milled, or dressed, so as to tightly engage the spring 1. It will now be seen that any movement of the spring 1 with respect to the shackles 32, 33 will be compelled to overcome the friction between the discs 38 and 34 and 35 and 39. It is also to be noted that instead of making the faces of discs 34, 35 as planes, they may be made conical and directly in contact with 38 and 39 respectively eliminating the discs 36 and 37.

Also while we have shown the support member 5 as of rigid construction, this may be a second spring similar to the spring 1 and our invention employed as shown may be applied either about one or both ends of the bolt 2 as indicated in Fig. 2. Also the shackles, or the spring may be bushed in any of the well known ways without departing from our invention.

We claim:

1. A spring shackle for a pair of coacting vehicle springs comprising a pair of side arms spaced apart, bolts connecting the ends of said arms and adapted to movably engage the springs, a pivot extending from one of said bolts and a shoulder therebetween, a disc about said pivot and movable with the adjacent arm, a second disc rotatably mounted on said pivot and having an extension adapted to engage one of the vehicle springs, and screw means on the end of said pivot adapted to clamp the discs against said shoulder.

2. A shock absorber for a pair of coacting vehicle members comprising a pair of arms spaced apart and having bolts connecting the ends of the arms adapted to carry the ends of the said springs respectively, a shouldered pivot extension, a pair of discs freely mounted on said pivot, an extension from one of said discs adapted to engage the disc with one of said springs, the other disc being constrained to move with the arms, and means forcing the discs against the pivot shoulder to establish friction during the relative rotation of the members on said pivot.

3. A shock absorber as set forth in claim 1 wherein a friction plate is interposed between the discs, said plate having compartments to hold lubricant and wherein one of the discs is formed with a flange to overhang the joint between the discs and to retain packing material therein to prevent the ingress of dirt.

4. A shock absorber as set forth in claim 2, wherein a friction plate is interposed between the discs, having compartments to hold lubricant and wherein one of the discs is formed with a flange to overhang the other disc and to retain packing material therein to prevent the ingress of dirt.

5. As an article of manufacture, a spring shackle for a pair of coacting vehicle members comprising arms spaced apart and a connecting bolt between each end of said arms, a projecting pivot on one of said bolts, a pair of discs and a friction plate carried on said pivot, an extension from one of the discs to engage with one of the vehicle springs and connecting means between the other disc and the shackle, screw means on one end and a shoulder on the other end of said pivot adapted to compress the discs and plate therebetween in frictional engagement.

In testimony whereof, we have hereunto set our hands.

ALEXANDER DE BRETTEVILLE.
GEORGE J. HENRY.